United States Patent Office 3,828,064
Patented Aug. 6, 1974

3,828,064
METHOD OF PREPARING 1,5-DISUBSTITUTED-2-NITROIMIDAZOLES
John Martin, Wayland, and Francis Johnson, Newton Lower Falls, Mass., assignors to The Dow Chemical Company, Midland, Mich.
No Drawing. Filed Oct. 25, 1972, Ser. No. 300,742
Int. Cl. C07d 49/36
U.S. Cl. 260—309           2 Claims

ABSTRACT OF THE DISCLOSURE

Various 1,5-disubstituted - 2 - nitroimidazoles are prepared by reacting a 1,5-disubstituted -2-haloimidazole in an organic solvent with an alkyl or aryl lithium compound at a temperature between minus 75° and minus 30° C. and thereafter contacting the mixture with a solution of dinitrogen tetroxide followed by isolation of the desired product.

BACKGROUND OF THE INVENTION 1,5-Disubstituted-2-nitroimidazoles are known antibiotic agents active against gram-positive and gram-negative microorganisms. However, known methods of preparing these compounds are not attractive from an economic point of view. It has been established that even though the structure of the compounds is simple, preparation of these compounds, as with 5-nitroimidazoles, by conventional methods are in general, inefficient. It is well established that direct nitration of imidazoles does not lead to electrophilic substitution in the 2-position.

Known methods for preparing these compounds are suggested by Lancini et al., U.S. Pat. 3,420,842 and J. Med. Chem. 12, pages 775–780 (1969), wherein substituted-2-aminoimidazoles are diazotized with an alkali metal nitrate in fluoroboric acid, followed by a reaction with an alkali metal nitrite and copper powder. However, yields are about 20–40 percent.

Another method has been described by Lancini et al. J. Antibiotics, Vol. XXI, No. 6, page 387 (1968) involves the microbiological oxidation of 2-aminoimidazoles to 2-nitroimidazoles in yields of 5–40 percent.

SUMMARY OF THE INVENTION

The present invention is directed to a method for preparing 1,5-disubstituted-2-nitroimidazole compounds corresponding to the formula

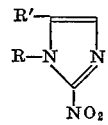

In this and succeeding formulate, R represents methyl or ethyl and R' represents methyl, ethyl, n-propyl or isopropyl, which comprises reacting a 1,5-disubstituted-2-haloimidazole with an alkyl or aryl lithium compound in the presence of an organic solvent at a temperature between minus (—) 75° and minus (—) 30° C. and thereafter contacting this reaction mixture with a solvent solution of dinitrogen tetroxide followed by isolation and separation of the desired 1,5-disubstituted-2-nitroimidazole product.

This sequence of steps can be characterized by the following reaction scheme

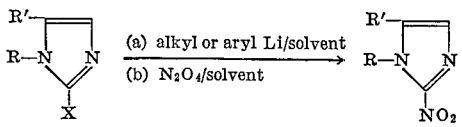

wherein R and R' are as hereinbefore defined and X is chloro or bromo.

In carrying out the present process, an appropriate 1,5-disubstituted 2-haloimidazole in a solvent is slowly added to an agitating solution of a lithiating agent in a solvent, which solution is under an atmosphere of nitrogen and at a temperature of from about minus (—) 75° to about minus (—) 30° C. Representative solvents for the lithiating reaction are, for example, diethyl ether, tetrahydrofuran, hexane or mixtures thereof. Represenative lithiating agents are, for example, the lower alkyllithiums, methyllithium, ethyllithium or butyllithium and aryllithiums such as phenyllithium. The specific lithium compound employed is not critical and is usually decided upon by considerations of cost and/or availability.

After addition is complete, the mixture is allowed to warm to room temperature and is thereafter slowly added to an agitated solution of dinitrogen tetroxide in a solvent, such as one of those hereinbefore set forth, which solution is under an atmosphere of nitrogen and at a temperature of from about —75° to about —30° C. Upon completion of the addition, the agitating solution is allowed to warm to room temperature and a solvent such as, for example, ethyl acetate, chloroform or benzene and a base such as aqueous sodium bicarbonate or sodium carbonate is added. A two phase solution results and the organic layer is separated from the inorganic layer. Additional solvent washing of the inorganic layer is carried out and the combined extracts are washed with a saturated brine solution and dried over anhydrous magnesium sulfate. The solvent is removed by evaporation under reduced pressure and the oily residue which remains is allowed to stand whereby the desired product crystallizes. The product is separated by conventional solid-liquid separation techniques such as filtration, centrifugation and decantation.

DESCRIPTION OF SOME PREFERRED EMBODIMENTS

In order that the present invention can be more fully understood, the following examples are given by way of illustration and should not be construed as limitations upon the overall scope of the same.

EXAMPLE I

1-Methyl-2-nitro-5-isopropylimidazole

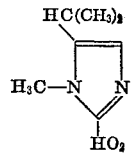

A solution was prepared by diluting 7 milliliters of butyllithium (1.6 molar solution in hexane) with 10 milliliters of dry diethyl ether. The solution was cooled with agitation under a nitrogen atmosphere to —75° C. To this solution was added dropwise over 15 minutes, 2.03 grams of 1-methyl-2-bromo-5-isopropylimidazole in 10 milliliters of dry diethyl ether. The yellow solution which resulted was allowed to warm to room temperature and thereafter added dropwise over 15 minutes into an agitated solution of 900 milligrams of dinitrogen tetroxide in 10 milliliters of dry diethyl ether under a nitrogen atmosphere at —75° C. The mixture was allowed to warm to room temperature over a 30 minute period. To this mixture was added 50 milliliters of ethyl acetate and 25 milliliters of a saturated aqueous solution of sodium bicarbonate. A two phase solution resulted and the organic layer was separated and combined with 25 milliliters of an additional ethyl acetate extract of the aqueous layer. The combined extracts were washed with 50 milliliters of a saturated aqueous brine solution and dried over anhydrous magnesium sulfate. The solvent was removed by evaporation under reduced pressure. The residue was sublimed at 160° C. at 0.2 millimeters of mercury and the 1-methyl-2-nitro-5-isopropylimidazole product was recovered from the sublimate by crystallization from a mixture of ether and hexane. The product was recovered in a yield of 410 milligrams and melted at 70°–75° C. and was identical in all respects with a known sample.

In an analogous manner employing generally the method of Example I and the appropriately substituted 1,5-disubstituted-2-haloimidazole, the following compounds are prepared.

1-Methyl-2-nitro-5-methylimidazole;
1-Methyl-2-nitro-5-ethylimidazole;
1-Ethyl-2-nitro-5-methylimidazole;
1-Ethyl-2-nitro-5-ethylimidazole;
1-Methyl-2-nitro-5-$n$-propylimidazole;
1-Ethyl-2-nitro-5-isopropylimidazole and
1-Ethyl-2-nitro-5-$n$-propylimidazole.

Preparation of starting materials

The 1,5 - disubstituted-2-haloimidazoles employed as starting materials can be prepared in a three step synthesis method which can be carried out in one reaction vessel without separation of the products of each step. The method comprises first cyclizing 2-halo-4-aminoimidazole hydrohalide followed by diazotizing the substituted-2-halo-4-aminoimidazole hydrohalide to the diazonium salt which is thereafter deaminated to the desired 1,5-disubstituted-2-haloimidazole.

This sequence of steps can be characterized by the following reaction scheme

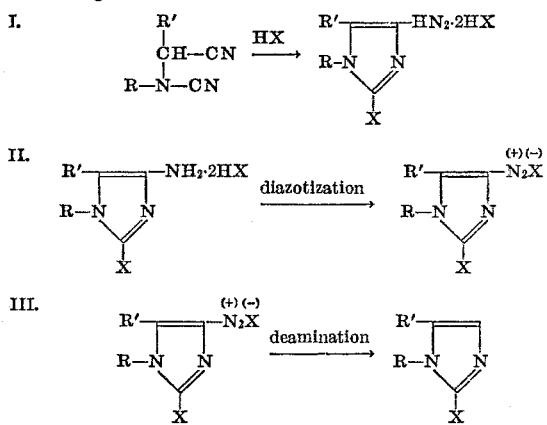

wherein R, R' and X are as hereinbefore defined.

In carrying out the preparation steps, an appropriately substituted α-cyanoaminonitrile is cyclized to the 1,5-disubstituted-2-halo-4-aminomidazole by slowly adding the nitrile reagent to an agitated solution of the appropriate hydrogen halide in glacial acetic acid at a temperature of from about 0° to about 50° C. This step and subsequent steps can be carried out utilizing atmospheric pressure. The reaction mixture is maintained under agitation for a period of from 15 to 25 hours. Thereafter, methylene chloride is added to the reaction mass and the mixture cooled to about minus 20° C. It is important that the methylene chloride be added prior to the cooling step so that the acetic acid present does not freeze. A saturated aqueous solution of sodium nitrite is slowly added to the reaction mixture at a rate such that the temperature of the reaction is maintained between about minus 30° and minus 15° C. The 1,5-disubstituted-2-halo-4-aminoimidazole hydrohalide product contained therein being diazotized by the nitrite. Upon completion of the sodium nitrite addition, an aqueous hypophosphorous acid solution which deaminates the diazonium salt hereinbefore formed is slowly added to the reaction mixture at a rate such that the temperature of the reaction is maintained between about minus 30° and minus 15° C. The mixture is maintained under agitation until the evolution of nitrogen ceases (usually in about 1 to 3 hours). The mixture is thereafter neutralized at a temperature below minus 15° C. with a base such as sodium hydroxide or potassium hydroxide. The reaction mixture is thoroughly extracted with methylene chloride and the combined, extracts are washed with water and dried. Any solids present are removed by filtration. The solvent is removed by evaporation under reduced pressure and the product is recovered by distillation.

The substituted α-cyanoaminonitrile starting material employed directly hereinabove of the formula

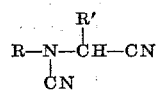

wherein R is methyl or ethyl and R' is as hereinbefore defined are known compounds and can be prepared by the methods taught in U.S. Pat. 2,743,291 wherein an appropriately substituted aminonitrile is reacted with cyanogen chloride under alkaline conditions in an inert solvent at room temperature to 50° C. These compounds can also be prepared as taught in U.S. Pat. 3,261,873 wherein a cyanamide is reacted with an alkyl cyanide having a reactive alpha substituent in the presence of a base.

What is claimed is:

1. A method for preparing 1,5 - disubstituted-2-nitroimidazoles corresponding to the formula

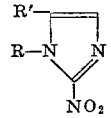

wherein R represents methyl or ethyl and R' represents methyl, ethyl, $n$-propyl or isopropyl which comprises reacting under an atmosphere of nitrogen a 1,5-disubstituted-2-haloimidazole corresponding to the formula

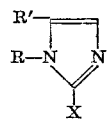

wherein R and R' are as hereinabove defined with a loweralkyl or phenyl lithium compound in the presence of an organic solvent from the group consisting of diethyl ether, tetrahydrofuran, hexane or mixtures thereof at a temperature between minus 75° and minus 30° C., and thereafter contacting the resulting mixture while under an atmosphere of nitrogen with dinitrogen tetroxide at a temperature between minus 75° and minus 30° C. and thereafter warming the mixture to room temperature, adding a solvent from the group consisting of ethyl acetate, chloroform or benzene and a base from the group consisting of sodium carbonate and sodium bicarbonate and separating and recovering the 1,5-disubstituted-2-nitroimidazole product therefrom.

2. The method of Claim 1 wherein the 1,5-disubstituted-2-haloimidazole is 1-methyl-2-bromo-5-isopropylimidazole and product is 1-methyl-2-nitro-5-isopropylimidazole.

References Cited

Coates et al. Organometallic Compounds, 3rd ed., Vol. 1, pp. 14–16, London, Methuen, 1967. QD411.C6.

Grimmett in: Katritzyk et al., Advances in Heterocyclic Chemistry, Vol. 12, p. 174, New York, Academic Press, 1970. QD400.A2.

Hofmann, Imidazoles and Its Derivatives Part I p. 127, N.Y., Interscience, 1953. QD401.H6.

Novikov et al. Chem. Abst. Vol. 73, No. 56028q (1970). QD1.A51.

NATALIE TROUSOF, Primary Examiner

U.S. Cl. X.R.

260—141

PO-1050
(5/69)

UNITED STATES PATENT OFFICE
CERTIFICATE OF CORRECTION

Patent No. 3,828,064          Dated August 6, 1974

Inventor(s) John Martin and Francis Johnson

It is certified that error appears in the above-identified patent and that said Letters Patent are hereby corrected as shown below:

Column 1, line 53, correct spelling of "formulae";

Column 2, line 8, correct spelling of "Representative";

Column 2, line 50, the formula should appear as follows:

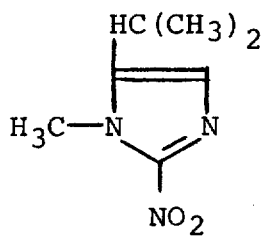

Column 4, line 64, correct the spelling of the reference "Katritzky".

Signed and sealed this 3rd day of December 1974.

(SEAL)
Attest:

McCOY M. GIBSON JR.          C. MARSHALL DANN
Attesting Officer            Commissioner of Patents

C-16,296